May 24, 1966     G. GERBER     3,252,511
TUBE WALLS
Filed Jan. 24, 1963
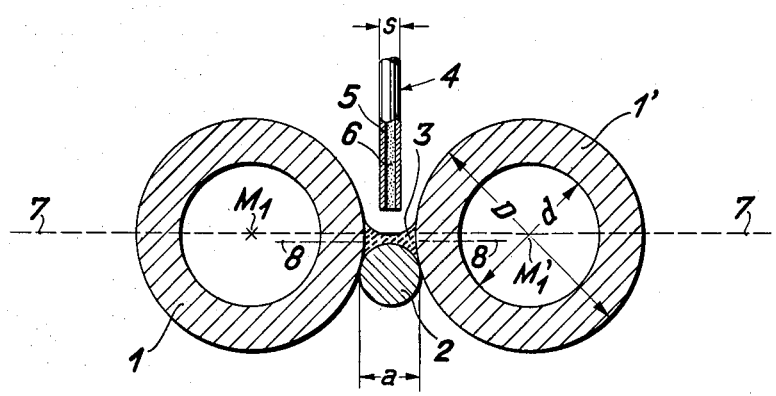
*Inventor:*
George Gerber
BY
ATTORNEYS 3,252,511
TUBE WALLS
George Gerber, Zumikon, Zurich, Switzerland, assignor to Sulzer Freres, Société Anonyme, Winterthur, Switzerland, a Swiss company
Filed Jan. 24, 1963, Ser. No. 253,697
Claims priority, application Switzerland, Jan. 26, 1962, 967/62
4 Claims. (Cl. 165—172)

The invention relates to welded tube walls or tube screens such as are employed for example in steam generators.

Coolable tube walls have been welded by methods wherein a connecting element disposed in parallel between two adjacent tubes is welded by a separate seam to each one of those tubes. Tube walls of this kind are used, for example, for linking combustion chambers in steam generators. In welding of a connecting element to two adjacent tubes, two weld seams have been made in one step by means of an electrical welding machine. This is effected by the use of two electrodes clamped to the machine spaced apart by a distance corresponding to the width of the connecting element.

In contrast to this method of the prior art, the method in accordance with the present invention includes disposing the tubes at a distance from one another, placing between the tubes and parallel to them a rod which serves as a welding bridge, and welding the rod to the two tubes in a single step by means of a single electrode.

Thus, in a tube wall made by the method of the present invention, the tubes of the wall are spaced apart and a rod is disposed in the space between two adjacent tubes in parallel relationship thereto, the rod being connected to the two adjacent tubes by means of a single weld seam.

According to a further feature of the method of the invention, the diameter $a$ (in mm.) of the rod is related to the outside diameter $D$ (in mm.) of the tube in accordance with the equation $a=1.2D^{0.6}\pm 5$ mm. This equation has been derived empirically from extensive tests.

Preferably, the weld seam is made in a shielding gas atmosphere. The use of carbon dioxide ($CO_2$) as a shielding gas has been found very advantageous.

Preferably, the cross-section of the rod used is circular, although it may have other cross-sections in which the ratio of the maximum to the minimum cross-sectional dimension is at most 2:1. The terms maximum and minimum cross-sectional dimension refer, for example, to the major and minor diameters of elliptical cross-sections, and the depth and width in the case of rectangular cross-sections.

According to a further feature of the invention, the center of gravity of the cross-sectional area of the weld seam is situated between the plane containing the axes of the two tubes joined by the rod (hereinafter called the first or central plane), and a second plane which is parallel to the first and spaced therefrom, on the side of that first plane where the rod is predominantly located, by a distance equal to the minimum cross-sectional dimension of the rod. Viewed from the side of the central plane from which the welding is preformed, the second plane is thus beyond or behind the central plane. In other words, the weld seam lies between the first plane and a plane parallel thereto which is spaced therefrom by a distance equal to the minimum cross-sectional dimension of the rod and positioned beyond the first plane when viewed from the side of the rod bounded by the weld seam. This prevents curving or warping of the tube wall during cooling after welding.

The invention will now be further described below with reference to the accompanying drawings in which the single figure of drawing shows a transverse cross-section of the two tubes joined according to the invention.

In the drawing, two adjacent tubes 1, 1', of a tube wall are spaced apart and are parallel to each other. In the space between them a rod 2 is disposed parallel to the tubes, thereby forming a welding bridge. The tubes have an outside diameter $D$ and an inside diameter $d$. The rod 2 of diameter $a$, which is shown with a round cross-section for purposes of illustration, is connected to the tubes 1 and 1' by a single or unitary weld seam 3. The weld seam 3 is made by means of a single electrode 4, the thickness of which is denoted by $s$, and which is shown partially sectioned in the drawing. It has been found that hollow wire, e.g. a folded wire, constitutes a desirable electrode for practice of the present invention. The flux 6, e.g. in powder form, is contained inside the hollow wire. The center of gravity of the cross-sectional area of the weld seam 3 is situated on the line 8—8 below the central plane 7—7 of the tube wall containing the axes or centers of gravity $M_1$, $M_1'$ of the tubes 1, and 1'. Accordingly the center of gravity of the weld seam is situated beyond the central plane when viewed from the welding side. The line 8—8 is spaced from the plane 7—7 by a distance less than the minimum cross-sectional dimension ($a$) of the rod 2.

Tests have shown that for a correct choice of rod diameter $a$ and an appropriate thickness $s$ of the electrode in relation to the outside diameter of the tubes adjacent the rod, it is possible for the rod to be welded to the two tubes in one pass. It has been found, for example that for tube outside diameters of from 32 to 48 mm. and with a rod diameter $a$ of from 6 to 15 mm., the electrode advantageously has a thickness $s$ of 3.25 mm. For outside tube diameters from 48 to 84 mm. and rod diameters of from 8 to 20 mm., it has been found advantageous to use an electrode of a thickness $s=4$ mm.

Although a round rod is satisfactory, the rod may have any other cross-section, e.g. a square cross-section or a rectangular cross-section. In such cases the cross-sectional area of the rod used should correspond substantially to the cross-sectional area of a round rod, of diameter $a$ (in mm.), specified by the equation $$a=1.2D^{0.6}\pm 5 \text{ mm.}$$

wherein $D$ is the outside diameter, in millimeters, of the tubes.

I claim:
1. A tube screen comprising a pair of spaced parallel tubes, a rod disposed between said tubes in contact with both on the same side of the plane defined by the axes of said tubes to define with said tubes a channel bounded by said plane, tubes and rod, and a unitary weld seam substantially filling said chamber and joining said tubes and rod, the center of gravity of the cross-sectional area of the weld seam lying between a first plane defined by the axes of said tubes and a second plane which is
    (a) parallel to said first plane,
    (b) spaced from said first plane by a distance equal to the minimum cross-sectional dimension of said rod, and
    (c) positioned beyond said first plane when viewed from the side of said rod bounded by said weld seam.
2. A tube screen according to claim 1 wherein the tubes have the same outer diameter $D$ and wherein the diameter of the rod in millimeters is substantially equal to 1.2 times $D$ raised to the 0.6th power plus or minus 5 millimeters, $D$ being given in millimeters.
3. A tube screen according to claim 1 wherein the tubes have the same outer diameter $D$ in millimeters, and wherein the cross-sectional area A of the rod in square millimeters is substantially equal to $$A = \pi/4(1.2D^{0.6} \pm 5)^2$$

4. A tube screen according to claim 3 wherein the ratio of the maximum to minimum cross-sectional dimensions of the rod is 2.

References Cited by the Examiner

UNITED STATES PATENTS

| 1,774,136 | 8/1930 | Forssblad | 122—235 |
| 2,327,750 | 8/1943 | Turner | 122—235 |
| 2,660,155 | 11/1953 | Chapman | 122—6 |
| 2,719,210 | 9/1955 | Chapman | 219—137 |

FREDERICK L. MATTESON, Jr., *Primary Examiner.*

RICHARD M. WOOD, CHARLES SUKALO,
*Examiners.*